Jan. 10, 1950  W. L. CARLSON  2,494,470
INDUCTION COIL
Filed Dec. 27, 1943  5 Sheets-Sheet 1

INVENTOR
Wilbur L. Carlson
BY
his ATTORNEYS

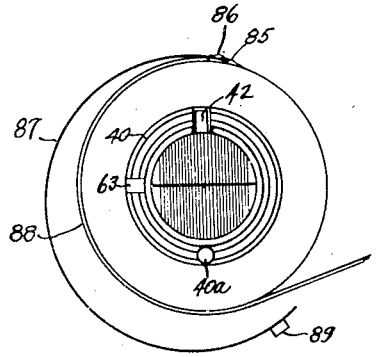
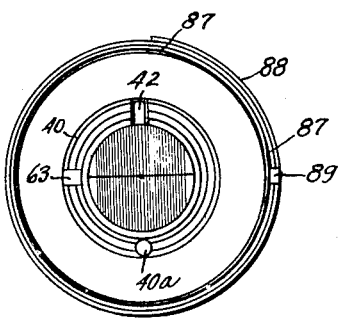
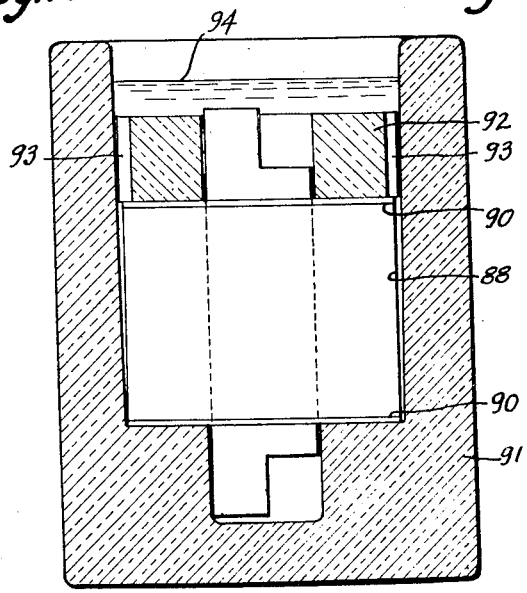
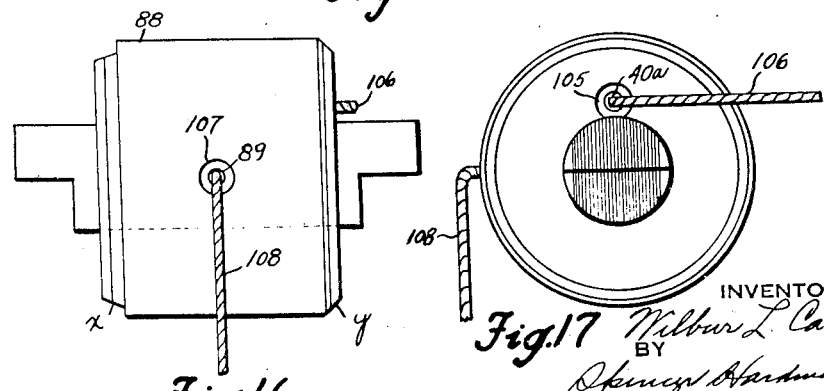
Fig. 13  Fig. 14  Fig. 15  Fig. 16  Fig. 17

Jan. 10, 1950     W. L. CARLSON     2,494,470
INDUCTION COIL

Filed Dec. 27, 1943     5 Sheets-Sheet 4

INVENTOR
Wilbur L. Carlson
BY
Spencer Hardman Fehr
his ATTORNEY

Jan. 10, 1950 W. L. CARLSON 2,494,470
INDUCTION COIL

Filed Dec. 27, 1943 5 Sheets-Sheet 5

INVENTOR.
Wilbur L. Carlson
BY
Spencer, Hardman & Fehr
His ATTORNEYS

Patented Jan. 10, 1950

2,494,470

UNITED STATES PATENT OFFICE 2,494,470

INDUCTION COIL

Wilbur L. Carlson, Rochester, N. Y., assignor to General Motors Corporation, Detroit, Mich., a corporation of Delaware Application December 27, 1943, Serial No. 515,674

5 Claims. (Cl. 175—361)

This invention relates to induction coils, and more particularly to ignition coils for aviation use.

It is an object of the present invention to provide an induction coil which will give satisfactory operation at any altitude. In this connection it is an object to provide a coil which is impervious to the entrance of moisture and gases and within which no gas can be formed during operation. This object is accomplished by completely impregnating the coil with a substance which initially is a relatively free flowing liquid, thereby facilitating impregnation, and which is capable of solidification without forming voids and which is unaffected by the temperature at which the coil is required to operate and which has no effect upon the insulation of the wires. The impregnating substance is preferably 100% polymerizable matter while in the liquid state, that is, it contains no volatile solvents. When it is polymerized it solidifies without perceptible shrinkage into a rocklike mass without leaving any voids. Hence the coil is impervious to the entrance of moisture or gases.

A further object of the invention is to provide an induction coil having high electrical output with minimum size and weight. This is accomplished by a novel arrangement of the layers of paper between the layers of turns of the secondary winding, such that there is greater thickness of insulation between coil turns of greater potential difference than between coil turns of lesser potential difference. By distributing the insulation according to electrical potential gradient, it is possible to provide the required insulation with the minimum of material, thus effecting a saving of material and a reduction of the size and weight of the coil.

A further object is to provide an induction coil of such construction that possibility of breakage or corrosion of any electrical connection either during the construction of the coil or during its use thereafter will be reduced to the minimum.

Further objects and advantages of the present invention will be apparent from the following description, reference being had to the accompanying drawings wherein a preferred embodiment of the present invention is clearly shown.

In the drawings:

Fig. 13 is an end view of the coil showing the connection between the outer end of the secondary and the secondary shield ribbon and a felt strip in one end of which said strip is to be wound together with the shield around the secondary winding.

Fig. 14 is a view showing the shield and felt strip wound around the secondary winding.

Fig. 15 shows the coil mounted within a porcelain cup for containing the polymerizable material with which the coil is impregnated. The cup being shown in section.

Figs. 16 and 17 are side and end views respectively of the completed coil.

Figure 18:
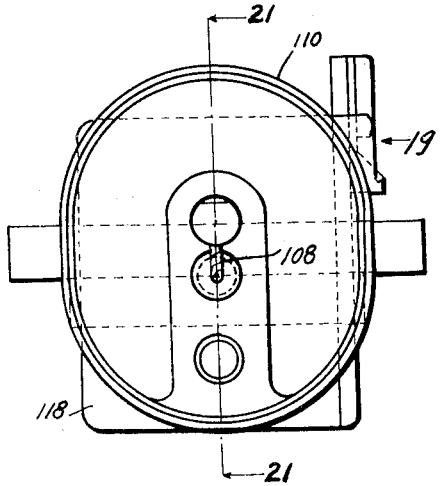
Fig. 18 is an end view of the assembly of the coil and its housing and is a view looking in the direction of arrow 18 of Fig. 19.
Figure 19:
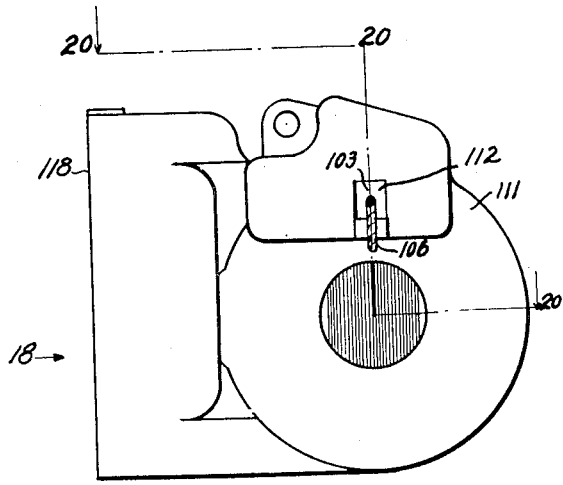

Fig. 19 being a view in the direction of arrow 19 of Fig. 18.

Figure 20:
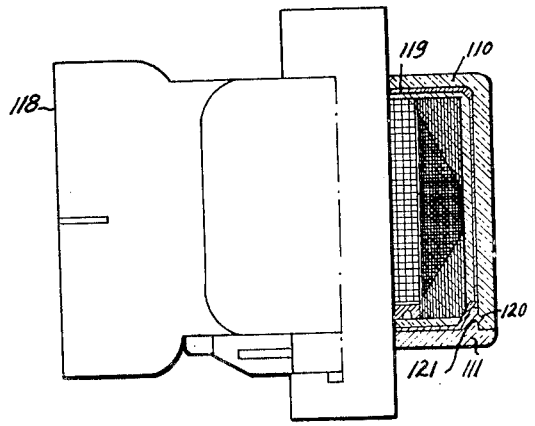

Fig. 20 is a view partly in section on the line 20—20 of Fig. 19.

Figure 21:
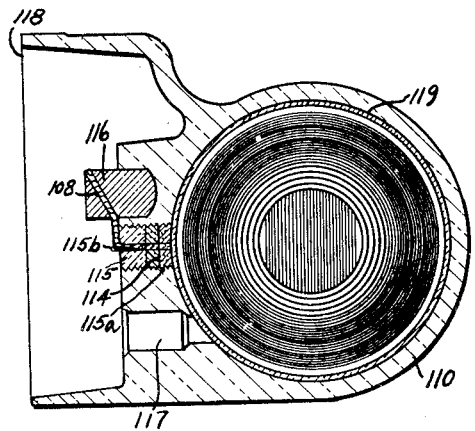

Fig. 21 is a sectional view on the line 21—21 of Fig. 18.

Figure 22:
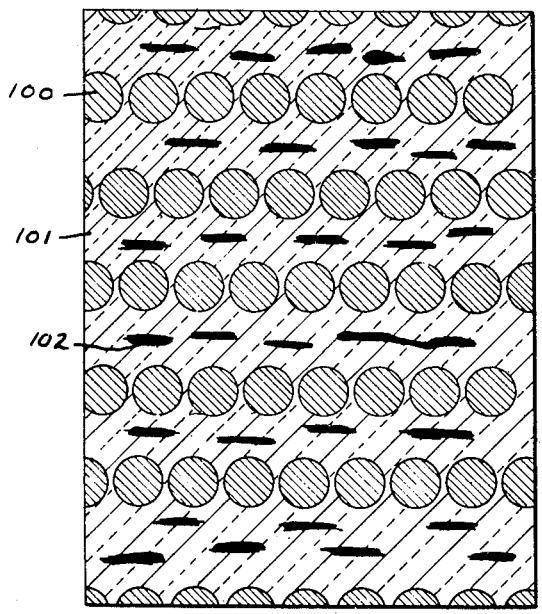

Fig. 22 is a microphotograph of a fragment of a longitudinal section thru the secondary winding of the ignition coil.

The core of the coil will now be described with reference to Figs. 1 to 11.

Figure 3:
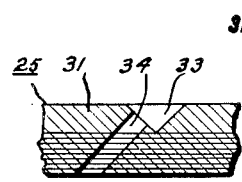
Fig. 3 is a fragmentary sectional view on line 3—3 of Fig. 1.
Figure 1:
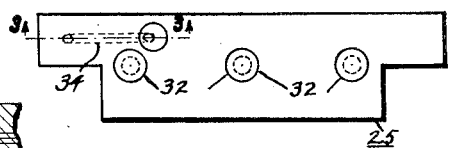
Fig. 1 is a side view of the coil core before being formed cylindrically.

The core is formed from magnetizable laminae 30 and two thick laminae 31 of magnetizable material secured by rivets 32. As shown in Fig. 3 one of the laminae 31 is counterbored at 33 in order to provide a starting port for a drill which forms a diagonal hole 34.

Figure 2:
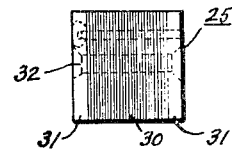
Fig. 2 is an end view thereof.
Figure 5:
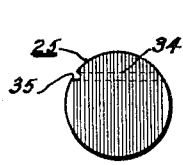
Fig. 5 is an end view thereof.
Figure 4:
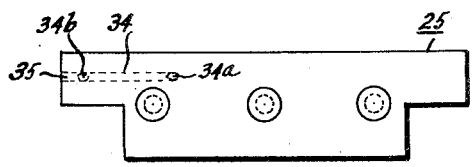
Fig. 4 is a side view of the coil core after being formed cylindrically.
Figure 7:
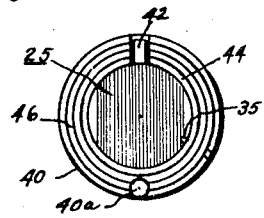
Fig. 7 is an end view of Fig. 6.
Figure 6:
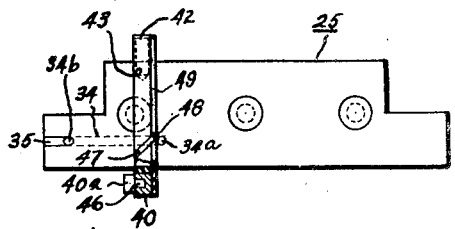
Fig. 6 is a side view of the coil core assembly with a terminal ring and insulating members therefor.
Figure 9:
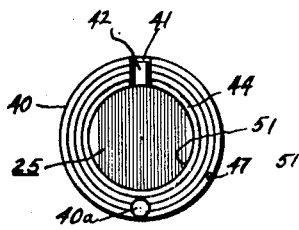
Fig. 9 is an end view thereof.
Figure 8:
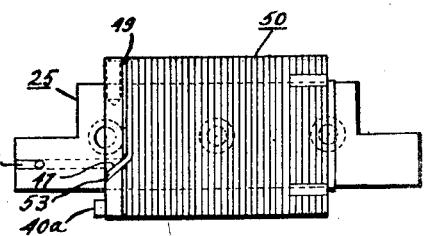
Fig. 8 is a side view of the coil core terminal ring and primary winding.
Figure 11:
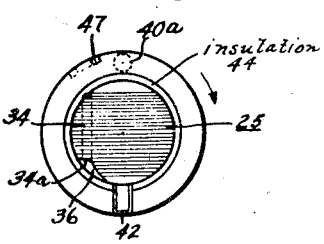
Fig. 11 is a sectional view on line 11—11 of Fig. 10.

The core which is originally rectangular as shown in Fig. 2 is shaped into a cylinder as shown in Fig. 5. This shaping operation, which may be done on a centerless grinder, removes a portion 55 of the laminae and particularly the portion which provides the counterbore 33 so that the hole 34 is uniform in diameter thruout as shown in Figs. 4 and 5. As viewed in Fig. 4, one end of the hole appears at 34a, the end on the opposite side appears at 34b. Fig. 6 shows the end 34b a short distance from the left face of the core 25, when said end 34b merges with a groove 35 of the same diameter as the hole 34. As shown in Fig. 11 the core 25 is grooved at 36 said groove merging with the end 34a of the hole 34.

With the core 25 there are assembled a non-magnetizable, tin coated, split ring 40 the ends of which are separated by a notch 41 which receives a non-conducting locating peg 42 forced into a hole 43 (Fig. 6) provided by the core 25. A split non-conducting band 44 insulates the ring 40 from the core 25. Ring 40 is provided with an annular groove 46 and with a diagonal notch 47 one end of which is in alignment with a notch 48 in a non-conducting washer 49, surrounding the core and placed against the ring 40. Before assembly, a disc 40a is soldered to the split ring 40. To the disc 40a a terminal wire is to be attached later.

Figure 10:
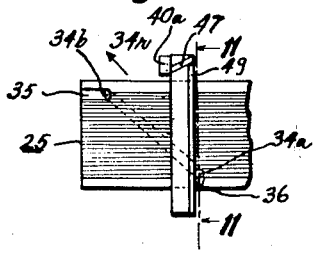
Fig. 10 is a fragmentary view in the direction of arrow 10 of Fig. 6.

Before starting to wind upon the core the primary winding 50 of enamelled wire, one end thereof is passed into the end 34a of hole 34 and is pushed thru hole 34 in the direction of the arrow 34r (Fig. 10). The insulation is stripped from the end which comes out at 34b and this end is pushed down into the groove 35 as shown at 51, Fig. 8. Before starting to rotate the core 25 by means of a winding machine, the wire is pressed into the notch 36 so that there is a gradual bend in the wire where it starts bending around the core which is rotated clockwise as viewed in Fig. 11 while the wire layers are being guided upon the core.

Before winding the first layer of primary turns, a few turns of insulation of paper 52 (Fig. 12) are wound upon the core. The primary 50 comprises, for example, four layers of 32 turns each separated by paper layers 52a. The end 53 is bared of its insulation and is pressed into the notch 48 provided by the washer 49 and into the notch 47 provided by the ring 40; and the end 53 is soldered to the ring 40. The other end 51 of the primary 50 which has been bared of its insulation is soldered to the core 25. It is important that the non-magnetizable metal parts (which may be of copper or brass) be coated with tin or solder metal so that no copper or brass will come into contact with the polymerized impregnating material which is of such nature that, after polymerization, checks may appear in those portions which come in contact with the metal. The bared ends of the primary 50 which are soldered to the core and ring are coated with solder metal.

Figure 12:
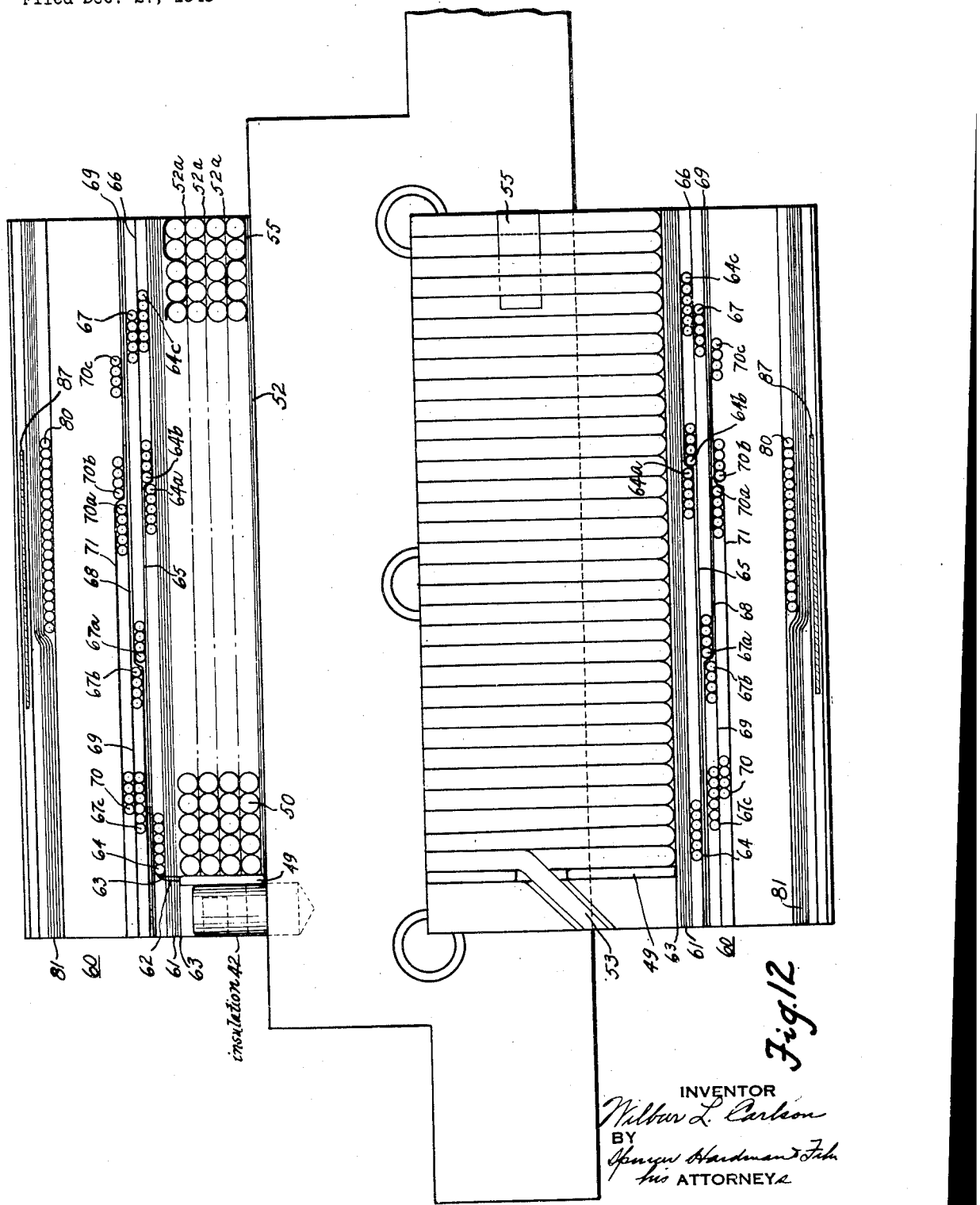
Fig. 12 is a diagrammatic view showing the coil core, the primary and secondary windings.

During the winding of the first layer of primary turns, a number of strips of cloth tape 55 are wound between certain turns as shown in Fig. 12; and, during the winding of the fourth layer of primary turns, these strips are wound into the fourth layer as shown. Therefore the strips 55 function to prevent displacement of the primary turns at one end of the coil. The other end is supported by the ring 40.

The secondary 60 is wound, before assembly with the primary 50 upon a non-conducting tube 61. The tube 61 is split or cut with the point of a knife to provide narrow hole 62 which receives a tinned copper ribbon 63, the outer end of which is connected to the first turn 64 of the secondary and the inner end of which is bent along the inside of the tube 61. About two-thirds of the turns of the first layer are wound upon the tube 61, that is, from the turn 64 to 64a (Fig. 12). Then a layer of paper 65 is wound on together with the next turn 64b; and the remaining third of the turns of the first layer wound ending at 64c. Next a layer of paper 66 is wound on and then the winding of the second layer starts with turn 67 and the winding of the second layer continues for about two-thirds of its turns or to the turn 67a. Then a layer of paper 68 is wound on together with turn 67b, and the remaining third of the turns of the second are wound ending with the turn 67c. Then a layer of paper 69 is wound on. The third layer is started with turn 70 and two-thirds of the third layer are wound on ending with turn 70a. Then a layer of paper 71 is wound on together with 70b. The winding of the last third of the third layer continues and ends with winding 70c. This process is continued for a number of layers which is about five layers less than the total number of layers. The next layer of wire follows the winding of two layers of paper, the succeeding layer of wire follows the winding of three layers of paper, and the other layers each follow the winding of five layers of paper. The layers of wire turns diminish in length, that is, they are wound in pyramidal form as indicated in Fig. 20, in order to increase the length of the leakage path as the potential difference between layers increases.

This method of winding provides that the thickness of paper between the middle thirds of succeeding layers of wire shall be twice the thickness of paper between the end third of a preceding layer of wire and the start third of a succeeding layer of wire, and that the thickness of paper between the start third of a preceding layer of wire shall be three times the thickness of paper between the end third of a preceding layer of wire and the start third of a succeeding layer of wire. When there are changes from single-turn layers to two-turn layers of paper and from two-turn layers of paper to three-turn layers of paper and from three-turn layers of paper to five-turn layers of paper, the differential between paper thicknesses at different one-third portions of the wire layers will be at least as great as before. This method of winding the paper during the winding of the coil layers provides for economical use of the paper. By distributing the paper somewhat in relation to potential differential gradient, less paper is required than with the conventional winding method if an equal number of layers of insulating paper is provided transversely between the windings so as to have the required amount of insulation at the points where the potential difference between the windings is the greatest. There is consequently a saving in bulk and weight.

Upon the last layer 80 are wound a plurality of layers of paper 81 and then a few more turns are wound upon paper layer 81 not shown in Fig. 12. The outside lead 85, Fig. 13, of the secondary winding is soldered at 86 to a tinned copper foil or ribbon 87 carrying a disc 89. Ribbon 87 (which is slightly wider than the outer wire layer) functions as a terminal connector and also an electrostatic shield which improves the operation of the coil, and eliminates the need for more widely spaced turns on the outer layer. The ribbon 87 together with a felt strip 88 are wound together as shown in Fig. 13 and Fig. 14 and the strip 88 is secured temporarily by a rubber band. The strip 88 is perforated so as to expose the disc 89. The disc 89 provides the high voltage terminal of the secondary. The zero voltage end of the secondary is grounded through the metal ribbon 63 which is pressed into the groove 46 of split ring 40 and is soldered thereto by flowing solder into the groove 46. The core ends are inserted within felt end rings 90 which are placed against the ends of coil assembly. The ring 90 adjacent the ring 40 has a hole to provide access to the disc 40a. The assembly of core and wires enveloped in the felt wrapping 88 and felt ends 90 is now ready for impregnation with a liquid polymerizable synthetic resin.

Before impregnation, the assembled coil is placed in a vacuum drying chamber for at least two hours. The chamber is heated to 170° F. and the vacuum should be at least 29" Hg (assuming standard barometer at 29.92"). Then the coil is cooled in a dry atmosphere.

The coil assembly is placed within a porcelain mold 91 (Fig. 15) and, upon this assembly, there is placed a porcelain disc 92 provided at its edge with a number of grooves 93. The assembled coil, and disc are placed in a vacuum filling chamber under at least 29" Hg vacuum (assuming standard barometer at 29.92") for about one hour to remove air and traces of moisture from the coil. While under this vacuum, the mold 91 is filled to the level 94 with a polymerizable liquid having the characteristics that it will not affect the enamel of the wire and will not be affected by the temperatures encountered in service and will not shrink perceptibly during polymerization or leave voids.

The material is chemically an unsaturated low polymer in liquid form as contrasted with syrups made of solid resins dissolved in volatile solvents which require careful drying of the impregnating material, such solid resins curing by chemical condensation yielding water and other end products. The material used in making the present coil is thermo-setting by direct polymerization through reactive double chemical bonds and without the formation of water by condensation or the evolution of any other gaseous by-products. The material is one which, after polymerization is started by application of heat, produces heat exothermically to cary out complete polymerization throughout the mass. Hence the cure will be uniform. At ordinary temperature, the material has a low vapor pressure which permits drawing a vacuum in excess of 28" Hg, thus facilitating the removal of air or other gases during impregnation. The polymerized material is resistant to acids and alkalies, has very low water absorption and very high dielectric strength. The material is stable at ordinary temperatures so that substantial quantities may be stored in advance of use. At time of use, a suitable catalyst, recommended by the manufacturer of the material, is added to speed polymerization.

While the material is flowing into the mold 91, care should be taken to prevent overflowing as the material boils at pressure corresponding to 29" Hg, vacuum. After the mold has been filled to level 94, the vacuum is reduced to 28" Hg, and the mold is completely filled. The vacuum is slowly reduced to zero and the material is forced into the coil by atmospheric pressure. For at least two cycles, the vacuum is again increased to 28" Hg, and then reduced gradually to zero in order to remove all traces of air from the mold. The mold is removed from the filling chamber and allowed to stand for two hours so that the coil assembly will be thoroughly soaked.

The paper for separating the layers of secondary turns is not selected for its good dielectric properies but rather for its ability to absorb the impregnating material and to be, in part dissolved thereby. A satisfactory paper is one which comprises about 84% rayon fiber and 16% caroa fiber. The rayon fiber is apparently dissolved in the impregnating material so that it becomes a part of the polymerized body which in the end provides the non-conducting spacing layers between the layers of secondary turns.

The assembled coil, cup and cap are placed in a heated presure chamber, when the assembly is subjected to a temperature of 170° F. and a pressure of 300 lbs. per square inch for a period of 6 hours. Then the temperature is increased to 230° F. for one hour while the pressure remains the same as before. Then release the pressure, remove the coil and mold and allow to cool; and then remove the coil from the mold. This treatment causes polymerization of the synthetic resin so that it becomes a solid, hard, impervious body completely filling all spaces even between the fine wires of the secondary winding which are preferably of approximately .004" diameter. To show how completely the resin has filled these spaces attention is directed to Fig. 22 which is a 100 times magnification of a section of the secondary winding. In this view the wires 100 are embedded in a matrix of the polymerized resin indicated by reference numeral 101. The layers of papers are no longer visible as most of the composition of the paper has been dissolved in the resin. The dark spots 102 are undissolved parts of the paper. The paper layers which, initially spaced the wire layers have become a part of the solid polymerized material which provides the insulating medium.

Increase of temperature decreases the time required for polymerization, but the temperature should not be so high as to cause blistering of the material before going into gel state. The lower the temperature, the longer the time, but the greater the density of the final product. Pressure during polymerization tends to eliminate voids. Because the reaction takes place under pressure, hence under a higher boiling point, the tendency to boil is reduced thereby insuring that the material does not boil during reaction. This pressure tends to compact the material. Since the pressure is the same throughout the coil, the density should be the same.

The felt wrappings 88 and 90 which absorbed the impregnating material become a hard impervious enclosure resisting all entrance of air and moisture. The enclosure is counterbored at 105 and 107 to expose the discs 40a and 89, respectively, and leads 106 and 108, respectively, are soldered thereto. The ends of the coil are machined as indicated at $x$ and $y$ in Fig. 16 so as to fit within the case and cover. The cylindrical surface of the coil is machined to provide $\frac{1}{16}$" clearance, all around, between the coil and its case.

The enclosing of the liquid impregnating material and coil in the molds 91 with the loosely fitting cover 92 during polymerization prevents the occurrence of soft or partially cured spots.

The following procedure is followed when assembling the coil, case 110 and cover 111. Locate the case 110 with open end uppermost. Locate the coil with disc 40a uppermost. Locate the secondary lead 108 for entry into the tapped hole 115a in the case 110. Paint the core-receiving hole at the bottom end of the case with a liquid impregnating compound 119. Pass the lead 108 through the tapped hole 115a and press the coil into the case, pulling the lead 108 out through this hole as the coil moves into the case. Pass two felt plugs 114 over the lead 108 and force them into the tapped hole. Pour a small amount of the compound 119 into the hole and pass a threaded plug 115 over the lead 108 and screw into the hole until flush with the case. Drive a wooden wedge 115b into the hole in plug 115 to seal it. Pass lead 108 through a hole in the metal insert 116; and pull it tight, and solder it to the insert. Paint the case groove 120 and the cover groove 121 and the core hole of the cover with the compound. Pass the lead 106 through the hole 103 in the metal insert 112 of the cover. Assemble the cover with the case, and pull the lead 106 tight and solder it to the insert 112.

Place the assembly in an oven at 170° F. for one hour. Place the assembly in a vacuum filling chamber and evacuate to at least 29" Hg vacuum (assuming standard barometer at 29.92"). While under vacuum, fill the case with the compound through the hole 117 and inspect the assembly for leaks from the case. If there are no leaks, remove the assembly and place in an oven under a pressure of 300 lbs. per square inch, at 170° F. for two hours. Clean the impregnating material from the outside of the assembly.

The particular coil disclosed herein is adapted for use in a magneto having a rotating, permanent magnet, which causes reversals of magnetic flux in a flux path of which the core 25 is a part. The process disclosed herein is adapted for the manufacture of various coils, and particularly for coils having very fine windings, such as .004" diameter wire. The aim of the present invention is to embed the windings, however fine and closely spaced, in a solid non-conducting body which has no voids and which is impervious to entrance of air and moisture. This has been accomplished by selecting a polymerizable material which is a relatively mobile liquid at ordinary temperature so that thorough impregnation can be effected without requiring that the liquid first be heated in order to increase its power of penetration thereby avoiding polymerization during impregnation and by selecting a liquid material which is substantially 100% polymerizable matter free of volatile solvents so that, during polymerization, there are no vapors formed which would leave voids when the material is cured.

The coil, prior to assembly in the case, is an assembly of windings and terminals embedded in a matrix of voidless, hard impervious insulating material without leads extending therefrom to be injured during handling. All of the connections between the windings and the terminals are embedded in the matrix. The felt shroud around the coil acts as a resilient filler which absorbs the compound and serves as a reinforcement therefor and prevents cracking or checking of the material. Thus the coil is provided with a hard, impervious shell.

The completed assembly comprises the coil hermetically sealed in a housing; comprising a cup-like case and a cover. The solidified compound in the grooves 120 and 121 provides a seal between the case and cover. All spaces between the coil, case and cover are filled with this same voidless, hard, impervious insulating material in which are embedded the leads from the coil terminals to terminals on the exterior of the housing. Since there is no place for air within the coil it is unaffected by changes in atmospheric pressure.

While it is possible to obtain a satisfactory coil by impregnating it after assembly with the case and cover, the procedure stated herein is considered the more reliable.

While the embodiment of the present invention as herein disclosed, constitutes a preferred form, it is to be understood that other forms might be adopted, all coming within the scope of the claims which follow.

What is claimed is as follows:

1. An induction coil secondary assembly comprising a non-conducting tube, a metal ribbon extending through one side of the tube to provide a connector lead extending from the inside of the tube and to provide means for attaching a secondary wire prior to winding, a secondary wound upon the tube, a terminal for the outer end of the secondary, and a non-magnetizable metallic ribbon surrounding the secondary to provide an electro-static shield, said ribbon being attached to the outer end of the secondary and supporting the terminal.

2. An induction coil comprising a magnetizable core; a primary winding surrounding the core and having its inner end attached thereto; a secondary winding surrounding the primary winding; an annular terminal member and an insulating member surrounding the core and directly supported thereby, said insulating member insulating the terminal from the core; means for connecting the terminal with the outer end of the primary winding and with the inner end of the secondary winding; and a terminal attached to the outer end of the secondary winding and supported thereby.

3. An induction coil having a primary sub-assembly comprising a magnetizable core, a primary winding thereon and having its inner end attached to the core and a split metal ring terminal and an annular member of insulating material directly supported on the core, said member insulating the terminal from the core, the terminal ring being connected with the outer end of the primary winding said coil having a secondary sub-assembly comprising a non-conducting tube, a metal ribbon extending through one side of the tube to provide a connector lead extending from the inside of the tube and to provide means for attaching a secondary wire prior to winding, a secondary wound upon the tube, a terminal for the outer end of the secondary, and a non-magnetizable metallic ribbon surrounding the secondary to provide an electrostatic shield, said second ribbon being attached to the outer end of the secondary and supporting a terminal for the secondary, the first mentioned metal ribbon being connected with the split ring.

4. An induction coil comprising a magnetizable core, a primary winding having its first turn attached to the core and wound thereon, a secondary winding surrounding the primary winding, a terminal member and an insulating member supported on the core projecting beyond the primary assembly, said insulating member insulating the terminal from the core, and means for electrically connecting the terminal with the last turn of the primary and with the first turn of the secondary, a terminal member supported by the secondary assembly and electrically connected with the last turn thereof, a wrapping of fibrous material surrounding the secondary, discs of fibrous material located against the ends of the winding assemblies, and a voidless matrix of solid non-conducting material in which the windings, terminal members and parts of fibrous material are embedded, said matrix being recessed to provide access to the terminal members to attach electrical conductors thereto.

5. An induction coil and housing assembly comprising coil subassembly including a laminated metal core, primary and secondary windings surrounding the core, metal inserts connected with the windings and a voidless matrix of solid insulating material embedding the windings and the connection between the windings and the inserts and having end portions of the core projecting from the matrix; and a casing comprising two preformed members for enclosing the matrix, each casing member having an opening through which an end of a core projects so as to hold coil subassembly free of the interior of the casing, and each of said members having an aperture through which a conductor connected with the inserts are threaded and electrically connected with terminals on the casing, one of said casing members having a passage through which a sealing compound is poured while in a fluid state after the coil has been assembled in the case and the connections are made, said compound when hard sealing all spaces between the casing and the core and also between the core and conductors.

WILBUR L. CARLSON.

REFERENCES CITED

The following references are of record in the file of this patent:

UNITED STATES PATENTS

| Number | Name | Date |
|---|---|---|
| 424,703 | Clarke | Apr. 1, 1890 |
| 762,111 | Apple | June 7, 1904 |
| 812,657 | Kitsee | Feb. 13, 1906 |
| 936,669 | Rypinski | Oct. 12, 1909 |
| 1,011,791 | Honold | Dec. 12, 1911 |
| 1,274,380 | Brislin | Aug. 6, 1918 |
| 1,326,366 | Milton | Dec. 30, 1919 |
| 1,333,004 | Vaughn | Mar. 9, 1920 |
| 1,474,152 | Kent | Nov. 13, 1923 |
| 1,455,199 | Groten, Jr. | May 15, 1923 |
| 1,497,415 | Thomas | June 10, 1924 |
| 1,704,151 | Simpson | Mar. 5, 1929 |
| 1,710,862 | Chryst | Apr. 30, 1929 |
| 1,792,730 | Chryst et al. | Feb. 17, 1931 |
| 1,816,680 | Kurath | July 28, 1931 |
| 1,826,297 | Apple | Oct. 6, 1931 |
| 1,827,571 | Fiene | Oct. 13, 1931 |
| 1,840,139 | Turner | Jan. 5, 1932 |
| 1,878,606 | Schneider | Sept. 20, 1932 |
| 2,116,318 | Miles, Jr. | May 3, 1938 |
| 2,141,141 | Kongsted | Dec. 20, 1938 |
| 2,214,384 | Roby | Sept. 10, 1940 |
| 2,266,925 | Verril | Dec. 23, 1941 |
| 2,328,443 | Foster | Aug. 3, 1943 |

FOREIGN PATENTS

| Number | Country | Date |
|---|---|---|
| 365,551 | Great Britain | Jan. 20, 1932 |